(12) United States Patent
Goeppert

(10) Patent No.: US 8,617,031 B2
(45) Date of Patent: Dec. 31, 2013

(54) METHOD FOR CONTROLLING AN AUTOMATED FRICTION CLUTCH

(75) Inventor: Georg Goeppert, Hausach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 111 days.

(21) Appl. No.: 13/494,125

(22) Filed: Jun. 12, 2012

(65) Prior Publication Data

US 2012/0252632 A1 Oct. 4, 2012

Related U.S. Application Data

(63) Continuation of application No. PCT/DE2010/001391, filed on Nov. 29, 2010.

(30) Foreign Application Priority Data

Dec. 14, 2009 (DE) .......................... 10 2009 058 249

(51) Int. Cl.
*B60W 10/02* (2006.01)

(52) U.S. Cl.
USPC ......................................... 477/175

(58) Field of Classification Search
USPC .................... 477/174, 175, 176, 180; 701/68
See application file for complete search history.

(56) References Cited

U.S. PATENT DOCUMENTS

| | | | |
|---|---|---|---|
| 6,001,044 A | 12/1999 | Amendt | |
| 7,998,026 B2 * | 8/2011 | Fodor et al. | 477/175 |
| 8,118,707 B2 * | 2/2012 | Brandsma et al. | 477/176 |

FOREIGN PATENT DOCUMENTS

| | | |
|---|---|---|
| DE | 19540921 | 5/1997 |
| DE | 102007033698 | 2/2008 |
| DE | 4042757 | 9/2008 |
| EP | 1580463 | 9/2005 |

* cited by examiner

*Primary Examiner* — David D Le
*Assistant Examiner* — David J Hlavka
(74) *Attorney, Agent, or Firm* — Simpson & Simpson, PLLC

(57) ABSTRACT

A method for controlling an automated friction clutch arranged in a drive train between an internal combustion engine and a gearbox, including: operating the friction clutch by a clutch actuator controlled by means of a controller; transmitting actual clutch torque by means of the friction clutch; implementing actual clutch torque that can be transmitted by means of the friction clutch and that can be adapted to the transmission behavior of the friction clutch by means of a control variable of the clutch actuator associated with a target torque of the clutch torque to be transmitted; operating the friction clutch in an engaged state while the target torque is specified; and adapting the target torque depending on clutch torque estimated from the operating data of the engine. The target torque corresponds to an engine torque that is generated by the internal combustion engine and that is applied with a safety margin.

3 Claims, No Drawings

METHOD FOR CONTROLLING AN AUTOMATED FRICTION CLUTCH

CROSS-REFERENCE TO RELATED APPLICATIONS

This application is filed under 35 U.S.C. §120 and §365(c) as a continuation of International Patent Application No. PCT/DE2010/001391 filed Nov. 29, 2010, which application claims priority from German Patent Application No. 10 2009 058 249.5 filed Dec. 14, 2009, which applications are incorporated herein by reference in their entirety.

TECHNICAL FIELD

The invention relates to a method for controlling an automated friction clutch arranged in a drive train between an internal combustion engine and a gearbox. The friction clutch is operated by a clutch actuator controlled by means of a controller. A real clutch torque that can be transmitted by means of the friction clutch and that can be adapted to the transmission behavior of the friction clutch is implemented by means of a control variable of the clutch actuator associated with a target torque of the clutch torque to be transmitted, and the friction clutch is operated in an engaged state while the target torque is specified, which corresponds to an engine torque that is provided by the internal combustion engine and that is applied with a safety margin.

BACKGROUND

Motor vehicles are known that comprise a drive train with an automated friction clutch arranged between an internal combustion engine and a transmission. The transmission can for example be a manually shifted or automatically actuated helical gearbox or a double-clutch transmission with two friction clutches.

The automated friction clutch independently performs clutch engagements triggered by a control unit. The control unit applies to the clutch actuator a control variable that is to be adjusted and corresponds to the clutch torque and is to be transmitted via the friction clutch. The control variable is determined as the target torque in the control unit on the basis of inputs that are provided to the control unit as sensor data fed directly from other control units, such as a transmission control unit, or the driver. The target torque is assigned control variables by means of a characteristic curve, characteristic map, or calculation. To adapt target torques to the real clutch torque that is to be transmitted via the friction clutch, the sampling point and the real clutch torque, for example, are regularly determined to allow the characteristic curve of the target torque to be adapted, if necessary, to the real clutch torque by means of the control variable that is, for example, an axial path of the friction clutch, a rotational speed, or a rotational angle of an electric motor of the clutch actuator, or a switching variable of the electric motor and which can be made plausible by means of a corresponding sensor such as a position transducer or rotational angle sensor. The real clutch torque can vary over the short-term and long-term and is dependent, among other things, on the coefficient of friction of the friction linings, the friction clutch operating temperature and the like.

While the friction clutch is operating in an engaged state without slip, adaptation is not possible since the transmitted clutch torque is not observable in this operating state, that is, it cannot be detected by the corresponding sensor. Consequently, the target torque specified in normal operation when the friction clutch is engaged to maintain the engine torque and a safety margin to prevent slip is reduced at regular intervals between gear shifts, for example depending on the driving situation, until slip arises in the friction clutch. The clutch torque transmitted via the friction clutch can be calculated from the engine torque data and the slip calculated from the differential rotational speed between the crankshaft and the transmission input shaft, can then be adapted as the target torque.

Friction clutch slip phases that are periodically introduced in this manner for adapting the target torque cause additional wear on the friction clutch, especially on the friction linings of the clutch disc, and lead to greater fuel consumption. When the interval between the adaptation procedures is increased, impaired clutch engagement is observed which causes uncomfortable shifting, especially in conjunction with an automatically actuated transmission.

The problem therefore arises of proposing a method for controlling an automated friction clutch in which the target torque is adapted with sufficient precision to the actually transmitted clutch torque with reduced fuel consumption without regularly introducing slip phases.

BRIEF SUMMARY

The problem noted above is solved by a method for controlling an automated friction clutch arranged in a drive train between an internal combustion engine and a gearbox. The friction clutch is operated by a clutch actuator controlled by means of a controller. An actual clutch torque that can be transmitted by means of the friction clutch and that can be adapted to the transmission behavior of the friction clutch is implemented by means of a control variable of the clutch actuator associated with a target torque of the clutch torque to be transmitted. The friction clutch is operated in an engaged state while the target torque is specified, which corresponds to an engine torque that is provided by the internal combustion engine and that is applied with a safety margin. The target torque is adapted depending on clutch torque estimated from the operating data of the internal combustion engine.

The engine torque, provided for example by an engine control unit of the internal combustion engine via a CAN bus to the control unit, is used to estimate the clutch torque transmitted by the friction clutch and is adapted as the target torque with the additional safety margin. The safety margin can be minimized enough for the friction clutch to manifest little or no slip when there is average engine torque, and at least part of the torque peaks of the dynamic engine torque is capped. Such a mode of operation of the friction clutch uses less energy than regularly activated slip mode at greater slip rotational speeds, and it allows the friction clutch to be opened faster, for example to initiate shifting.

When the clutch torque is correctly estimated, that is, if the transmitted clutch torque corresponds to the target torque and the clutch actuator therefore sets the correct target torque via the control variable, the friction clutch is in a stable operating state with less slip, for example with a rotational speed difference up to 50 RPM. The slip can be adjusted or regulated so that only the torque peaks of the dynamic engine torque resulting from the development of uneven torque during crankshaft rotation from the firing of the individual cylinders of the internal combustion engine are not transferred via the friction clutch, and these torque peaks can be dampened beforehand by a torsional vibration damper arranged between the crankshaft and friction clutch, for example, a dual-mass flywheel. The clutch torque can be regularly estimated at brief intervals that can only be limited by the sampling rate for renewing the engine for data and the computational performance of the control unit. To form a robust estimation, a plurality of sequential engine torques can for example be averaged by forming a moving average.

When the estimated clutch torque transferred as a current target torque is miscalculated, two different estimation errors arise:

1. If the estimated clutch torque is greater than the actual clutch torque transmitted via the friction clutch, excessively high target torque arises in comparison to the actually transmitted clutch torque. This high target torque corrects the control variable in the disengagement direction of the friction clutch, causing greater slip to arise above the permissible, low slip, and this activates the slip control of the friction clutch. The slip control minimizes this slip by adjusting the control variable and adapts the target torque when the threshold is reached for the specified low or insignificant slip.

2. If the estimated clutch torque is lower than the actual clutch torque transmitted by the friction clutch, the target torque is adapted so that the target torque is excessively low in comparison to the control variable, which raises the higher control variable, thereby causing the friction clutch to additionally tighten. The greater compression of the friction linings causes a reduction in the specified slip, and the slip is no longer observable. The control variable is then changed to disengage the friction clutch until at least the specified slip is observed. When this slip is reached, the new target torque is subsequently adapted.

In this manner, slip states exceeding the specified degree of slip are not generated regularly but only when there is a discrepancy between the engine torque and the applied target torque which allows the number of slip phases to be significantly reduced and fuel consumption to be lowered. The high sampling rate for estimating the clutch torque significantly enhances the control result. The estimated clutch torque is controlled as needed between the two extreme situations of estimated clutch torque that is too high or too low, and the number of control procedures where high estimated clutch torque generates a slip phase with activated slip control is much lower in comparison to regular adaptation at predetermined intervals.

What I claim is:

1. A method for controlling an automated friction clutch arranged in a drive train between an internal combustion engine and a gearbox, comprising:
   operating the friction clutch by a clutch actuator controlled by means of a controller;
   transmitting first torque from the internal combustion engine by means of the friction clutch;
   estimating, using engine torque provided by an engine control unit of the internal combustion engine, the first torque transmitted by the friction clutch;
   generating a target torque by adding a safety margin to the estimated torque;
   operating the friction clutch in an engaged state at the target torque;
   when the target torque is lower than the first clutch torque from the internal combustion engine transmitted by the friction clutch:
      increasing the target torque;
      increasing slip until a specified slip is reached in the friction clutch; and
      generating, in response to reaching the specified slip, an adjusted clutch torque; and
   adapting the adjusted clutch torque as the target torque.

2. A method for controlling an automated friction clutch arranged in a drive train between an internal combustion engine and a gearbox, comprising:
   operating the friction clutch with a clutch actuator controlled by means of a controller using a control variable of the clutch actuator, the control variable associated with a target torque to be transmitted by the clutch;
   transmitting first torque from the internal combustion engine by means of the friction clutch;
   estimating, using engine torque provided by an engine control unit of the internal combustion engine, the torque transmitted by the friction clutch;
   generating a target torque by adding a safety margin to the estimated torque;
   operating the friction clutch in an engaged state at the target torque; and,
   when the target torque is greater than the first clutch torque from the internal combustion engine transmitted by the friction clutch:
      reducing the target torque so that the target torque is lower than the control variable; and,
      tightening the friction clutch.

3. A method for controlling an automated friction clutch arranged in a drive train between an internal combustion engine and a gearbox, comprising:
   operating the friction clutch by a clutch actuator controlled by means of a controller;
   transmitting first torque from the internal combustion engine by means of the friction clutch;
   estimating, using engine torque provided by an engine control unit of the internal combustion engine, the torque transmitted by the friction clutch;
   generating a target torque by adding a safety margin to the estimated torque;
   operating the friction clutch in an engaged state at the target torque; and,
   when the target torque is greater than the first clutch torque from the internal combustion engine transmitted by the friction clutch:
      reducing the target torque;
      tightening the friction clutch;
      reducing a specified slip of the friction clutch until the friction clutch is no longer slipping;
      disengaging the friction clutch until the friction clutch slips at the specified slip; and,
      changing the target torque to the torque of the friction clutch at the specified slip.

* * * * *